United States Patent
Park et al.

(10) Patent No.: US 12,120,800 B2
(45) Date of Patent: *Oct. 15, 2024

(54) INDUCTION HEATING APPARATUS AND METHOD FOR CONTROLLING INDUCTION HEATING APPARATUS

(71) Applicant: LG ELECTRONICS INC., Seoul (KR)

(72) Inventors: Wongyu Park, Seoul (KR); Gwang Rok Kim, Seoul (KR); Bada Yoon, Seoul (KR); John Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 799 days.

This patent is subject to a terminal disclaimer.

(21) Appl. No.: 17/271,112

(22) PCT Filed: Aug. 30, 2019

(86) PCT No.: PCT/KR2019/011207
§ 371 (c)(1),
(2) Date: Feb. 24, 2021

(87) PCT Pub. No.: WO2020/046070
PCT Pub. Date: Mar. 5, 2020

(65) Prior Publication Data
US 2021/0329747 A1   Oct. 21, 2021

(30) Foreign Application Priority Data

Aug. 30, 2018 (KR) .................. 10-2018-0103042
Nov. 7, 2018 (KR) .................. 10-2018-0136132

(51) Int. Cl.
*H05B 6/06* (2006.01)
*H02M 3/158* (2006.01)
(Continued)

(52) U.S. Cl.
CPC ............ *H05B 6/065* (2013.01); *H02M 3/158* (2013.01); *H05B 6/04* (2013.01); *H05B 6/1272* (2013.01)

(58) Field of Classification Search
CPC ...... H02M 1/008; H02M 3/158; H02M 5/458; H02M 7/4815; H02M 3/156; H05B 6/04;
(Continued)

(56) References Cited

U.S. PATENT DOCUMENTS 9,277,598 B2 * 3/2016 Lee .................. H05B 6/1272
11,540,360 B2 * 12/2022 Park .................. H05B 6/065
(Continued)

FOREIGN PATENT DOCUMENTS

CN   106247416   12/2016
EP   2 506 663   10/2012
(Continued)

OTHER PUBLICATIONS

International Search Report (with English Translation) and Written Opinion dated Dec. 24, 2019 issued in Application No. PCT/KR2019/011207.
(Continued)

*Primary Examiner* — Quang T Van
(74) *Attorney, Agent, or Firm* — KED & Associates LLP

(57) ABSTRACT

A method for controlling an induction heating device according to an embodiment of the present disclosure includes driving a first working coil at a first target frequency, receiving a driving command for a second working coil, stopping the driving of the first working coil and driving the second working coil at a preset first adjustment frequency, and determining a second target frequency of the second working coil corresponding to the driving command for the second working coil.

18 Claims, 8 Drawing Sheets

(51) Int. Cl.
*H05B 6/04* (2006.01)
*H05B 6/12* (2006.01)

(58) Field of Classification Search
CPC ...... H05B 6/065; H05B 6/1272; H05B 6/062; H05B 6/1209; Y02B 70/10; G03C 1/061; G03C 1/29
USPC ....... 219/620, 621, 622, 623, 624, 625, 626, 219/627, 660, 661, 662, 663, 664, 665, 219/666, 667, 670, 672, 673, 674, 675, 219/676, 600, 445.1; 363/21, 97
See application file for complete search history.

(56) References Cited

U.S. PATENT DOCUMENTS

| | | |
|---|---|---|
| 2007/0135037 A1 | 6/2007 | Barragan Perez et al. |
| 2010/0237065 A1 | 9/2010 | Cho et al. |
| 2012/0248098 A1 | 10/2012 | Lee et al. |
| 2016/0150597 A1 | 5/2016 | Yun et al. |
| 2018/0166199 A1 | 6/2018 | Hachiya et al. |
| 2020/0383512 A1 | 12/2020 | Ito |
| 2021/0227645 A1 | 7/2021 | Yoshino |

FOREIGN PATENT DOCUMENTS

| | | |
|---|---|---|
| EP | 2 506 668 | 10/2012 |
| JP | 2012-084509 | 4/2012 |
| JP | 2013-191519 | 9/2013 |
| JP | 2017-168236 | 9/2017 |
| KR | 10-2012-0109965 | 10/2012 |
| KR | 10-1735754 | 5/2017 |
| KR | 10-2017-0075913 | 7/2017 |

OTHER PUBLICATIONS

International Search Report dated Dec. 18, 2019.
European Search Report dated Jan. 28, 2020.
European Office Action dated Oct. 13, 2020.
Australian Office Action dated Dec. 17, 2021 issued in AU Application No. 2019328101.
United States Office Action dated Mar. 11, 2022 issued in co-pending related U.S. Appl. No. 16/556,504.
U.S. Appl. No. 16/556,504, filed Aug. 30, 2019.
U.S. Appl. No. 17/271,159, filed Feb. 24, 2021.
Chinese Office Action dated Sep. 22, 2022 issued in CN Application No. 201980056698.X.
U.S. Office Action dated Aug. 30, 2024 issued in U.S. Appl. No. 17/271,159.

* cited by examiner

INDUCTION HEATING APPARATUS AND METHOD FOR CONTROLLING INDUCTION HEATING APPARATUS

CROSS-REFERENCE TO RELATED PATENT APPLICATIONS

This application is a U.S. National Stage Application under 35 U.S.C. § 371 of PCT Application No. PCT/KR2019/011207, filed Aug. 30, 2019, which claims priority to Korean Patent Application No. 10-2018-0103042, filed Aug. 30, 2018, and Korean Patent Application No. 10-2018-0136132, filed Nov. 7, 2018, whose entire disclosures are hereby incorporated by reference.

TECHNICAL FIELD

The present disclosure relates to an induction heating device and a method for controlling the inducting heating device. More particularly, the present disclosure relates to an induction heating device capable of reducing interference noise and a method for controlling the induction heating device.

BACKGROUND ART

Various types of cooking utensils are being used to heat food in homes or restaurants. Conventionally, gas ranges using gas as a fuel have come into wide use. However, recently, devices for heating a container, for example, a cooking container such as a cooking pot, using electricity without using gas have come into use.

A method of heating a container using electricity is divided into a resistance heating method and an induction heating method. The resistance heating method is a method of heating a container by transferring heat generated when a current is passed through a metal-resistant wire or a non-metallic heating element such as silicon carbide to the container via radiation or conduction. The induction heating method is a method of generating an eddy current in a container that is made of a metal component by using a magnetic field that occurs around a working coil when a predetermined magnitude of high-frequency power is applied to the working coil so that the container itself is heated.

A principle of the induction heating method will be described in more detail as follows. First, as power is applied to the induction heating device, a predetermined magnitude of high-frequency voltage is applied to the working coil. Accordingly, an induction magnetic field occurs around the working coil disposed in the induction heating device. When a magnetic line of force of the induction magnetic field passes through the bottom of the container including a metal component that is placed on the induction heating device, an eddy current occurs in the bottom of the container. When the eddy current flows through the bottom of the container, the container itself is heated.

An induction heating device that is currently being used includes two or more heating areas and two or more working coils corresponding to the heating areas. For example, when a user who uses an induction heating device having two heating areas wishes to respectively place containers on the two heating areas and performs cooking by using the containers simultaneously, power for driving is supplied to each of the two working coils. As power is supplied to each working coil, each working coil generates a resonant frequency.

In this case, when an absolute value of a difference value between resonant frequencies of respective working coils is included in an audible frequency band (2 k to 15 kHz), interference noise is generated by driving of the working coils. The interference noise generated as described above causes great inconvenience to the user who uses the induction heating device, and may cause the user to suspect a failure of the induction heating device.

As such, various methods have been proposed to reduce interference noise of an induction heating device having two or more working coils. One of the methods to reduce the interference noise is to adjust an output of each heating area or adjust an operating frequency of each working coil by controlling an operation of a power module for supplying power to a working coil. For example, Korean Patent Registration No. 10-1735754 discloses that, in an induction heating device having a plurality of working coils, a switching element connected to each induction coil is sequentially turned on/off in a time division manner, and thereby interference noise is prevented even when the plurality of working coils are driven simultaneously.

FIG. 1 is a graph illustrating a frequency control method for reducing interference noise of an induction heating device according to the related art.

FIG. 1 illustrates a driving process of an induction heating device having two working coils. In FIG. 1, f1 represents a driving frequency of a first working coil, and f2 represents a driving frequency of a second working coil. Also, t represents time.

When a user issues a driving command for a first working coil via an interface unit of the induction heating device, the first working coil may operate at a driving frequency corresponding to the driving command issued by the user (for example, 30 kHz) so as to provide an output corresponding to the driving command issued by the user.

When the first working coil is driven at a driving frequency of 30 kHz, the user may issue a driving command for a second working coil. When the driving command for the second working coil is input at a time point T1, the second working coil may start to be driven at a preset frequency (for example, 70 kHz). As such, when the second working coil starts to be driven at the time point T1, the first working coil may be continuously driven at the existing driving frequency (30 kHz).

Subsequently, the induction heating device may adjust a driving frequency of the second working coil until the driving frequency of the second working coil reaches a frequency for allowing the second working coil to supply an output corresponding to the driving command for the second working coil, that is, a target frequency (for example, 30 kHz). When the driving frequency of the second working coil reaches the target frequency at a time point T2, the second working coil may be driven at 30 kHz after the time point T2.

According to the above-described process, both the first working coil and the second working coil may maintain a driving state thereof from the time point T1 to the time point T2 after the driving command for the second working coil is input. In this period (T1 to T2), a difference value between the driving frequency of the first working coil and the driving frequency of the second working coil may be included in an audible frequency band (2 k to 15 kHz). As a result, interference noise is generated from the time point T1 to the time point T2 by driving of the second working coil.

In addition, even when a difference between the target frequency of the second working coil determined by the process illustrated in FIG. 1 and the driving frequency of the existing first driving coil that is being driven is included in the audible frequency band (2 k to 15 kHZ), there is a problem in that interference noise occurs. For example, in FIG. 1, when the target frequency of the second working coil is determined to be 37 kHz instead of 30 kHz in a state where the target frequency of the first working coil is 30 kHz, since a difference between the driving frequency of the first working coil and the driving frequency of the second working coil is 7 kHz and is included in the audible frequency band, interference noise caused by simultaneous driving of the first working coil and the second working coil occurs.

DISCLOSURE

Technical Problem

An aspect of the present disclosure is to provide an induction heating device capable of reducing interference noise that may occur when two or more working coils perform a heating operation, and a method for controlling the induction heating device.

The technical aspects of the present disclosure are not limited to the above-mentioned aspects, and the other aspects and the advantages of the present disclosure which are not mentioned can be understood by the following description, and more clearly understood by embodiments of the present disclosure. It will be also readily seen that the aspects and the advantages of the present disclosure may be realized by means indicated in the patent claims and a combination thereof.

Technical Solution

According to an embodiment of the present disclosure, there is provided a method for controlling an induction heating device, the method including driving a first working coil at a first target frequency, receiving a driving command for a second working coil, stopping the driving of the first working coil and driving the second working coil at a preset first adjustment frequency, and determining a second target frequency of the second working coil corresponding to the driving command for the second working coil.

In an embodiment of the present disclosure, the determining of the second target frequency of the second working coil may include reducing a driving frequency of the second working coil and determining a driving frequency when an output of the second working coil corresponds to a requested output corresponding to the driving command for the second working coil as the second target frequency.

Further, in an embodiment of the present disclosure, the method for controlling an induction heating device may further include determining a first final driving frequency of the first working coil and a second final driving frequency of the second working coil based on the first target frequency and the second target frequency, respectively, and driving the first working coil at the first final driving frequency and driving the second working coil at the second final driving frequency.

Further, in an embodiment of the present disclosure, the determining of the first final driving frequency of the first working coil and the second final driving frequency of the second working coil may include calculating a difference value between the first target frequency and the second target frequency, and determining the first final driving frequency and the second final driving frequency according to a comparison result between the difference value and a preset reference value.

Further, in an embodiment of the present disclosure, when the difference value is less than a first reference value, the first final driving frequency and the second final driving frequency may be set to be equal to each other.

Further, in an embodiment of the present disclosure, when the difference value is less than the first reference value, the first final driving frequency and the second final driving frequency may be set as any one among the first target frequency and the second target frequency.

Further, in an embodiment of the present disclosure, when the difference value is equal to or greater than the first reference value and less than a second reference value, a difference between the first final driving frequency and the second final driving frequency may be set to be equal to or greater than a preset noise avoidance setting value.

Further, in an embodiment of the present disclosure, when the difference value is equal to or greater than the first reference value and less than the second reference value, a value obtained by increasing a larger value among the first target frequency and the second target frequency by the preset noise avoidance setting value or more and a smaller value among the first target frequency and the second target frequency may be set as the first final driving frequency and the second final driving frequency, respectively.

Further, in an embodiment of the present disclosure, when the difference value is equal to or greater than the second reference value, the first final driving frequency may be set as the first target frequency, and the second final driving frequency may be set as the second target frequency.

According to another embodiment of the present disclosure, there is provided an induction heating device including a first working coil disposed to correspond to a first heating area, a second working coil disposed to correspond to a second heating area, and a control unit configured to adjust driving frequencies of the first working coil and the second working coil according to a driving command input by a user. In an embodiment of the present disclosure, the control unit may drive the first working coil at a first target frequency, receive a driving command for the second working coil, stop driving of the first working coil and drive the second working coil at a preset first adjustment frequency, and determine a second target frequency of the second working coil corresponding to the driving command for the second working coil.

In an embodiment of the present disclosure, the control unit may reduce a driving frequency of the second working coil and determine a driving frequency when an output of the second working coil corresponds to a requested output corresponding to the driving command for the second working coil as the second target frequency.

Further, in an embodiment of the present disclosure, the control unit may determine a first final driving frequency of the first working coil and a second final driving frequency of the second working coil based on the first target frequency and the second target frequency, respectively, and may drive the first working coil at the first final driving frequency and drive the second working coil at the second final driving frequency.

Further, in an embodiment of the present disclosure, the control unit may calculate a difference value between the first target frequency and the second target frequency and may determine the first final driving frequency and the second final driving frequency according to a comparison result between the difference value and a preset reference value.

Further, in an embodiment of the present disclosure, when the difference value is less than a first reference value, the first final driving frequency and the second final driving frequency may be set to be equal to each other.

Further, in an embodiment of the present disclosure, when the difference value is less than the first reference value, the first final driving frequency and the second final driving frequency may be set as any one among the first target frequency and the second target frequency.

Further, in an embodiment of the present disclosure, when the difference value is equal to or greater than the first reference value and less than a second reference value, a difference between the first final driving frequency and the second final driving frequency may be set to be equal to or greater than a preset noise avoidance setting value.

Further, in an embodiment of the present disclosure, when the difference value is equal to or greater than the first reference value and less than the second reference value, a value obtained by increasing a larger value among the first target frequency and the second target frequency by the preset noise avoidance setting value or more and a smaller value among the first target frequency and the second target frequency may be set as the first final driving frequency and the second final driving frequency, respectively.

Further, in an embodiment of the present disclosure, when the difference value is equal to or greater than the second reference value, the first final driving frequency may be set as the first target frequency, and the second final driving frequency may be set as the second target frequency.

Advantageous Effects

According to embodiments of the present disclosure, there is an advantage in that it is possible to reduce interference noise that may occur when two or more working coils provided in the induction heating device perform a heating operation.

MODES OF THE INVENTION

Figure 1:
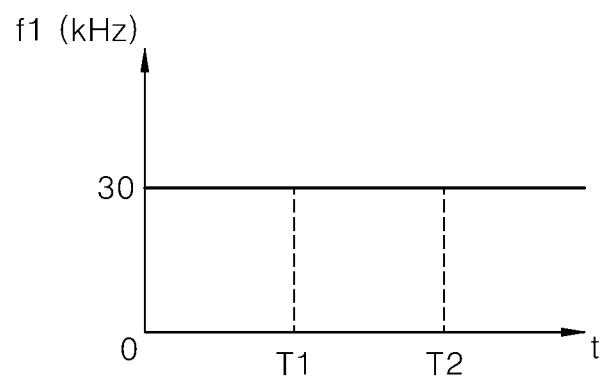
FIG. 1 is a graph illustrating a frequency control method for reducing interference noise of an induction heating device according to the related art.
Figure 1:
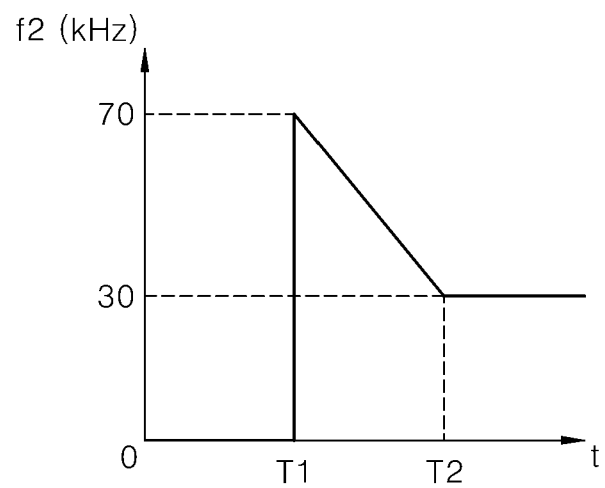

The aforementioned aspects, features and advantages will be described in detail with reference to the accompanying drawings, such that those skilled in the art can easily carry out a technical idea of the present disclosure. In the description of the embodiments, the detailed description of well-known related configurations or functions will be omitted when it is deemed that such description will cause ambiguous interpretation of the present disclosure. Hereinafter, preferred embodiments of the present disclosure will be described in detail with reference to the accompanying drawings. In the drawings, same reference numerals designate same or like elements.

Figure 2:
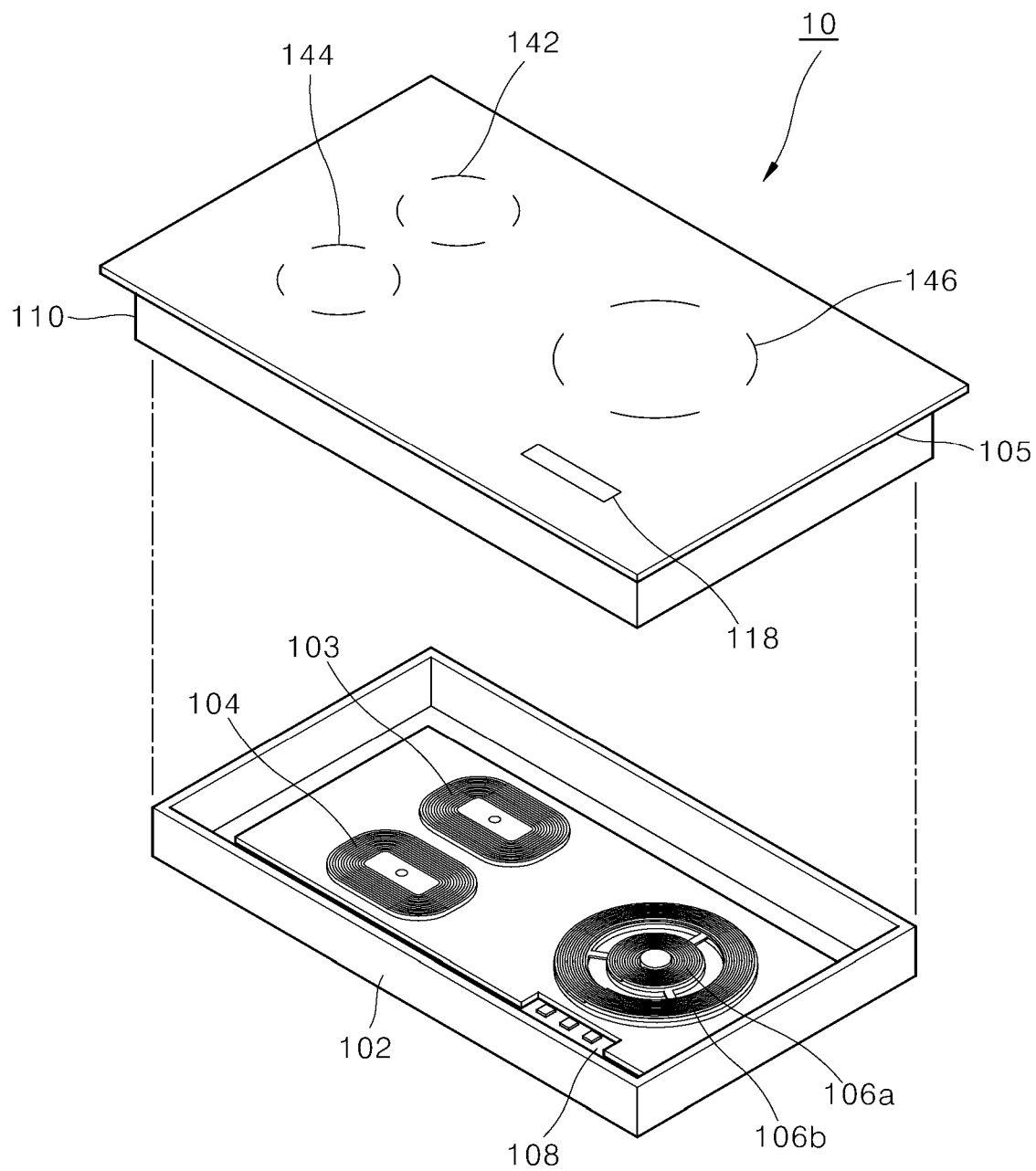
FIG. 2 is a perspective view illustrating an induction heating device according to an embodiment of the present disclosure.

FIG. 2 is a perspective view illustrating an induction heating device according to an embodiment of the present disclosure.

Referring to FIG. 2, an induction heating device 10 according to an embodiment of the present disclosure may include a case 102 constituting a main body, and a cover plate 110 coupled to the case 102 to seal the case 102.

A lower surface of the cover plate 110 may be coupled to an upper surface of the case 102 to seal a space formed inside the case 102 from the outside. An upper surface of the cover plate 110 may be provided with an upper plate portion 105 on which a container for cooking food may be placed. The upper plate portion 105 may be made of various materials, for example, a tempered glass material such as ceramic glass.

Working coils 103, 104, and 106a and 106b for heating a container may be disposed in an inner space of the case 102 formed by coupling of the cover plate 110 and the case 203. More specifically, a first working coil 103, a second working coil 104, and third working coils 106a and 106b may be disposed inside the case 102.

In FIG. 2, the first working coil 103 and the second working coil 104 each may have a rectangular shape with curved corners, and the third working coils 106a and 106b may have a circular shape, but a shape of each working coil may vary depending on the embodiment.

In addition, the number and arrangement of working coils provided in the induction heating device 10 may vary depending on the embodiment.

In an embodiment of the present disclosure, the third working coils 106a and 106b may be composed of two coils, that is, an inner coil 106a and an outer coil 106b. FIG. 2 illustrates an embodiment in which two coils constitute the third working coil, but the number of coils constituting the third working coil and the number of coils constituting the inner coil and the outer coil may vary depending on the embodiment.

For example, the third working coil may be composed of four coils. Here, two coils disposed inside the third working coil may be defined as an inner coil, and the other two coils disposed outside may be defined as an outer coil. In another example, three coils disposed inside the third working coil may be defined as an inner coil, and the other one coil disposed outside may be defined as an outer coil.

Further, when a user places a container on the cover plate 110, a first heating area 142, a second heating area 144, and a third heating area 146 may be displayed on a surface of the upper plate portion 105 of the cover plate 110 at positions respectively corresponding to positions of the first working coil 103, the second working coil 104, and the third working coils 106a and 106b such that the user matches a position of the container with a position of the first working coil 103, the second working coil 104, or the third working coils 106a and 106b.

Further, the inner space of the case 102 may be provided with an interface unit 108 having a function of allowing a user to apply power, adjusting outputs of the working coils 103, 104, and 106a and 106b, or displaying information related to the induction heating device 10. Hereinafter, the present disclosure will be described with reference to an embodiment in which the interface unit 108 is implemented as a touch panel capable of both inputting information by means of touch and displaying information, but the interface unit 108 may be implemented as a different form or structure depending on the embodiment.

Further, the upper plate portion 105 of the cover plate 110 may be provided with a manipulation area 118 at a position corresponding to a position of the interface unit 108. In the manipulation area 118, a specific character or image for a user's manipulation or for displaying information may be displayed. The user may perform a desired operation by manipulating (for example, touching) a specific point of the manipulation area 118 with reference to the character or image displayed on the manipulation area 118. In addition, various types of information output by the interface unit 114 may be displayed via the manipulation area 118 according to the user's manipulation or an operation of the induction heating device 10.

Further, a power module (not illustrated) for supplying power to the working coils 103, 104, and 106a and 106b or the interface unit 114 may be disposed in the inner space of the case 102. The power module may be electrically connected to the working coils 103, 104, and 106a and 106b or the interface unit 108, and may convert power applied from an external power source into power suitable for driving of the working coils 103, 104, and 106a and 106b or the interface unit 108, and supply the converted power to the working coils 103, 104, and 106a and 106b or the interface unit 108.

For reference, FIG. 2 illustrates an embodiment in which three working coils 103, 104, and 106a and 106b are disposed in the inner space of the case 102. In some embodiments, one working coil or four working coils may be disposed in the inner space of the case 102.

Although not illustrated in FIG. 2, a control unit (not illustrated) may be disposed in the inner space of the case 102. The control unit (not illustrated) may control power supply to the working coils 103, 104, and 106a and 106b based on driving of the power module according to a user's command (heating command, heating end command, thermal power control command, and the like) input via the interface unit 108.

The user may place the container on a desired heating area among the first heating area 142, the second heating area 144, and the third heating area 146, and then may issue a heating command with a thermal power setting for the heating area on which the container is placed.

The user's heating command input via the manipulation area 118 may be input to the control unit (not illustrated) as a driving command for a working coil corresponding to the heating area on which the user places the container. The control unit (not illustrated) receiving the driving command may drive the working coil, which is a target of the driving command, to perform a heating operation on the container.

Figure 3:
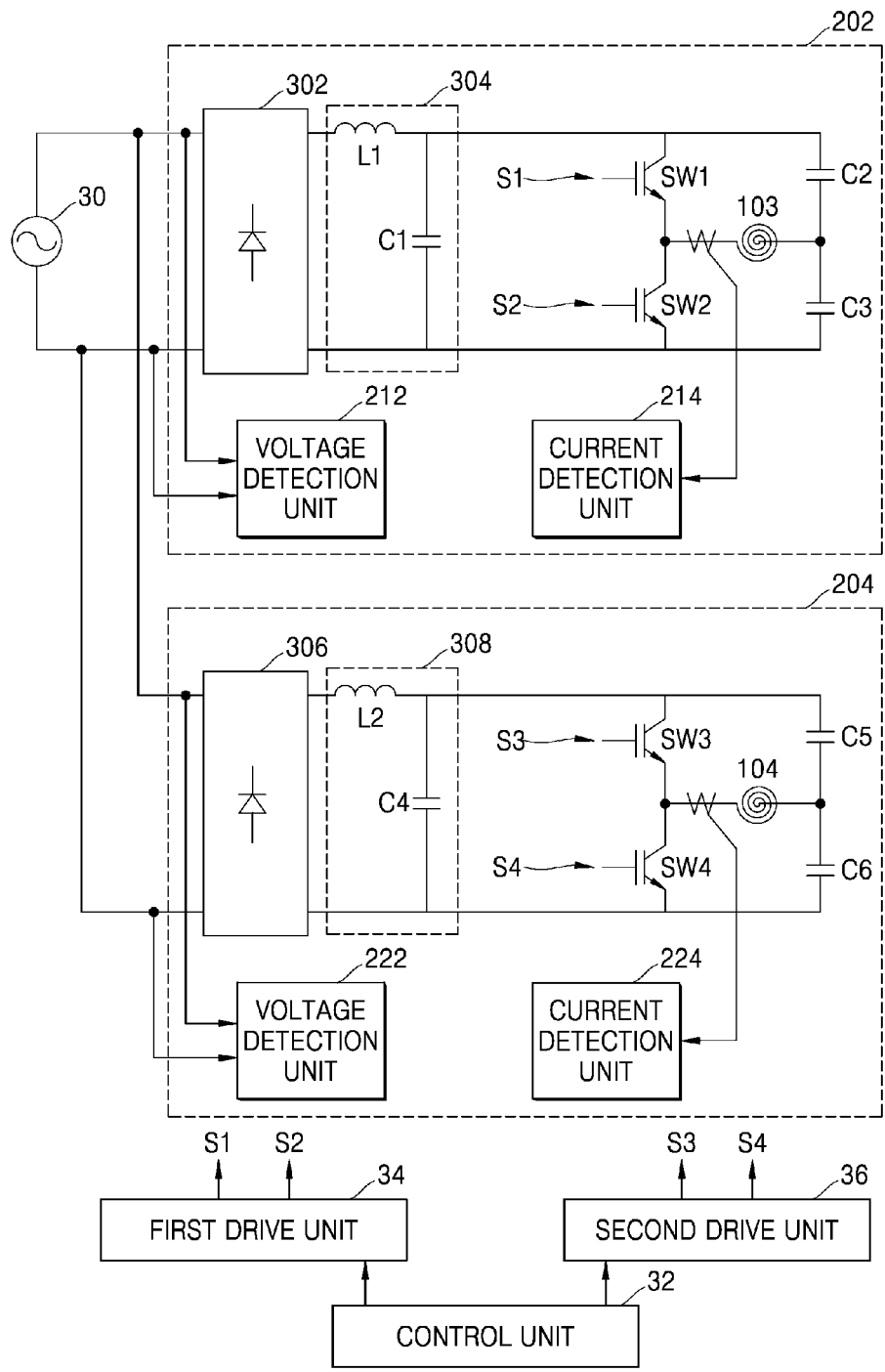
FIG. 3 is a circuit diagram illustrating a working coil and a power module of an induction heating device according to an embodiment of the present disclosure.

FIG. 3 is a circuit diagram illustrating a working coil and a power module of an induction heating device according to an embodiment of the present disclosure.

For reference, FIG. 3 is a circuit diagram illustrating a case where an induction heating device according to an embodiment of the present disclosure includes two working coils, that is, a first working coil 103 and a second working coil 104. However, as described above, the induction heating device according to an embodiment of the present disclosure may have two or more working coils, and a method for controlling the induction heating device described below may be applied to an induction heating device having two or more working coils in the same manner.

Referring to FIG. 3, the induction heating device according to an embodiment of the present disclosure may include two power modules, that is, a first power module 202 and a second power module 204. The first power module 202 and the second power module 204 may convert alternating current (AC) power supplied from an external power source 30 to supply power for driving each of the first working coil 103 and the second working coil 104.

The first power module 202 may include a rectification unit 302 and a smoothing unit 304. The rectification unit 302 may rectify and output AC voltage supplied from the external power source 30. The smoothing unit 304 may include a first inductor L1 and a first capacitor C1, and may convert the voltage output from the rectification unit 302 into direct current (DC) voltage to output the DC voltage.

The second power module 204 also may include a rectification unit 306 and a smoothing unit 308. The rectification unit 306 may rectify and output AC voltage supplied from the external power source 30. The smoothing unit 308 may include a second inductor L2 and a fourth capacitor C4, and may convert the voltage output from the rectification unit 306 into DC voltage to output the DC voltage.

Further, the first power module 202 may include a plurality of switching elements SW1 and SW2 and a plurality of capacitors C2 and C3.

The first switching element SW1 and the second switching element SW2 may be connected in series with each other, and may repeatedly perform turn-on and turn-off operations by means of a first switching signal S1 and a second switching signal S2 output from a first driving unit 34. In the present disclosure, the turn-on and turn-off operations of the switching elements are referred to as "switching operation".

A second capacitor C2 and a third capacitor C3 may be connected in series with each other. The first switching element SW1, the second switching element SW2, the second capacitor C2, and the third capacitor C3 may be connected in parallel to each other.

The first working coil 103 may be connected between a connection point between the first switching element SW1 and the second switching element SW2 and a connection point between the second capacitor C2 and the third capacitor C3. When the first switching element SW1 and the second switching element SW2 perform a switching operation due to the first switching signal S1 and the second switching signal S2 respectively applied to the first switching element SW1 and the second switching element SW2, AC power may be supplied to the first working coil 103 to perform induction heating.

The second power module 204 also may include a plurality of switching elements SW3 and SW4 and a plurality of capacitors C5 and C6.

The third switching element SW3 and the fourth switching element SW4 may be connected in series with each other, and may repeatedly perform turn-on and turn-off operations, that is, a switching operation by means of a third switching signal S3 and a fourth switching signal S4 output from a second driving unit 36.

A fifth capacitor C5 and a sixth capacitor C6 may be connected in series with each other. The third switching element SW3, the fourth switching element SW4, the fifth capacitor C5, and the sixth capacitor C6 may be connected in parallel to each other.

The second working coil 104 may be connected between a connection point between the third switching element SW3 and the fourth switching element SW4 and a connection point between the fifth capacitor C5 and the sixth capacitor C6. When the third switching element SW3 and the fourth switching element SW4 perform a switching operation due to the third switching signal S3 and the fourth switching signal S4 respectively applied to the third switching element SW3 and the fourth switching element SW4, AC power may be supplied to the second working coil 104 to perform induction heating.

The first driving unit 34 may apply the first switching signal S1 and the second switching signal S2 to the first switching element SW1 and the second switching element SW2 included in the first power module 202, respectively. In addition, the second driving unit 36 may apply the third switching signal S3 and the fourth switching signal S4 to the third switching element SW3 and the fourth switching element SW4 included in the second power module 204, respectively.

A control unit 32 may apply a control signal to each of the first driving unit 34 and the second driving unit 36 to control outputs of the switching signals S1 and S2 applied by the first driving unit 34 and outputs of the switching signals S3 and S4 applied by the second driving unit 36.

The control unit 32 may adjust switching frequencies of the first switching signal S1 and the second switching signal S2 applied by the first driving unit 34, and switching frequencies of the third switching signal S3 and the fourth switching signal S4 applied by the second driving unit 36 to respectively adjust a driving frequency of the first working coil 103 and a driving frequency of the second working coil 104. An amount of power supplied to the first working coil 103 or the second working coil 104 may vary depending on the driving frequency adjusted by the control unit 32. Accordingly, the driving frequency of the first working coil 103 or the second working coil 104 and an output amount of the first working coil 103 or the second working coil 104 may vary.

Voltage detection units 212 and 222 may measure a magnitude of a voltage input to the first power module 202, that is, a magnitude of an input voltage. In addition, current detection units 214 and 224 may measure a magnitude of a current input to the first and second working coils 103 and 104, that is, a magnitude of an input current.

The control unit 32 may receive the magnitude of the input voltage from the voltage detection units 212 and 222, and may receive the magnitude of the input current from the current detection units 214 and 224. The control unit 32 may calculate an output amount of the first working coil 103 and the second working coil 104, that is, an amount of power supplied by the first working coil 103 and the second working coil 104 by using the magnitudes of the received input voltage and the input current. In the present disclosure, a method in which the control unit 32 calculates an amount of power of each working coil by using the magnitudes of the input voltage and the input current is the same as a conventional method, and accordingly a detailed description thereof is omitted.

As described above, a user may place a container on a desired heating area, and then may issue a heating command with a thermal power setting for the heating area on which the container is placed via the manipulation area 118. The user's heating command input via the manipulation area 118 may be input to the control unit 32 as a driving command for a working coil corresponding to the heating area on which the user places the container. The control unit 32 receiving the driving command may drive the working coil, which is a target of the driving command, to perform a heating operation on the container.

Here, when only one working coil is driven, interference noise phenomenon described above may not occur. However, when a user issues a driving command to another working coil while one working coil is being driven, the interference noise phenomenon described above may occur according to a magnitude of a driving frequency of each working coil.

The control unit 32 of the induction heating device according to the present disclosure may determine a target frequency of each working coil when a user inputs a driving command for another working coil while one working coil is being driven, and may perform frequency control so as to reduce interference noise based on the determined target frequency of each working coil.

Here, the target frequency of each working coil means a driving frequency corresponding to thermal power or an output according to a driving command issued with respect to each working coil by the user. In other words, the target frequency means a driving frequency of each working coil for allowing each working coil to supply thermal power or an output desired by the user who issued the driving command.

For example, when the control unit 32 of the induction heating device according to the present disclosure is requested to drive the second working coil 104 in a state where the first working coil 103 is being driven at a first target frequency, the control unit 32 may determine a second target frequency of the second working coil 104. The control unit 32 may determine a driving mode (coupling mode, separation mode, normal mode) for reducing a noise of the induction heating device based on the determined second target frequency and the first target frequency.

The control unit 32 may determine a final driving frequency for reducing interference noises of the first working coil 103 and the second working coil 104 based on the driving mode determined as described above. The control unit 32 may drive each working coil based on the determined final driving frequency, thereby reducing interference noises generated when the two working coils are driven simultaneously.

Hereinafter, a frequency control method for reducing interference noise of an induction heating device according to the present disclosure will be described in detail with reference to the accompanying drawings. For reference, in FIG. 4 to FIG. 6, f1 represents a driving frequency of the first working coil 103, and f2 represents a driving frequency of the second working coil 104. In addition, T represents time.

Figure 4:
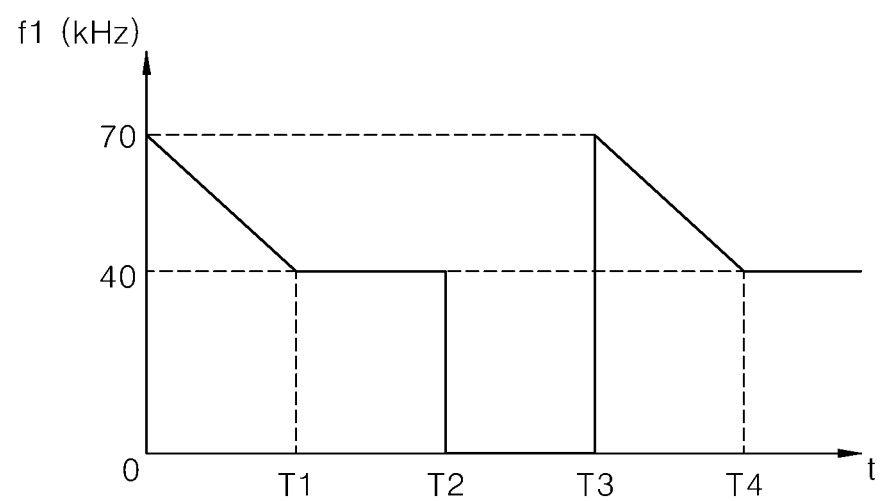
FIG. 4 is a graph illustrating a process of controlling driving frequencies of a first working coil and a second working coil when an induction heating device according to an embodiment of the present disclosure is driven in a coupling mode.
Figure 4:
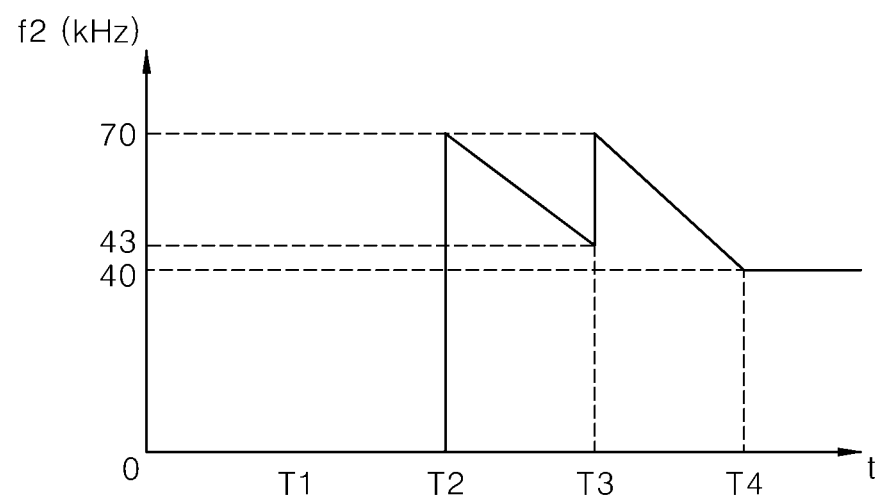
Figure 5:
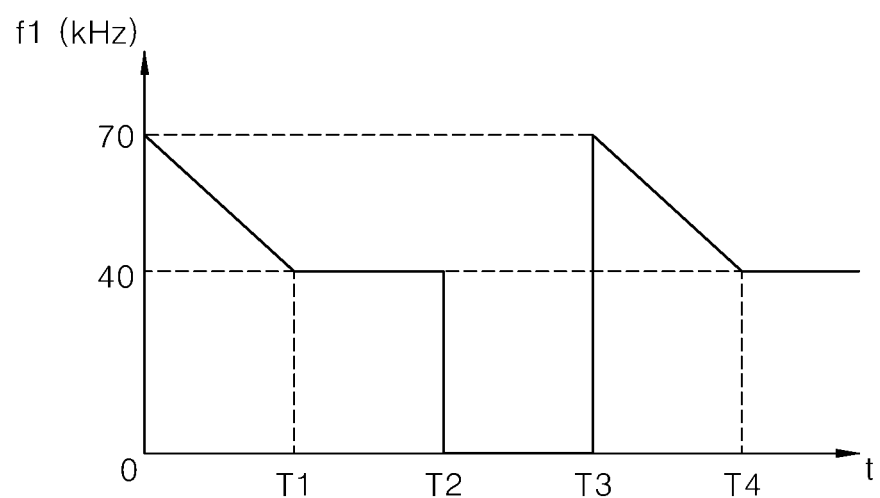
FIG. 5 is a graph illustrating a process of controlling driving frequencies of a first working coil and a second working coil when an induction heating device according to an embodiment of the present disclosure is driven in a separation mode.
Figure 5:
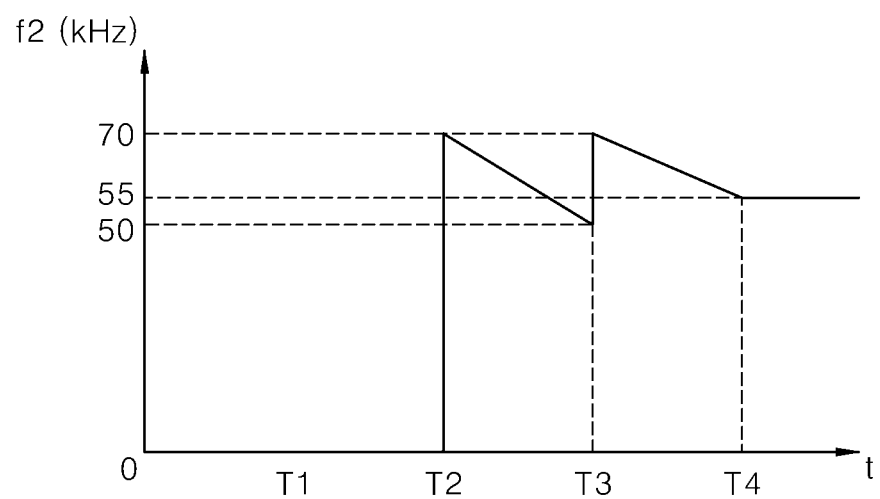
Figure 6:
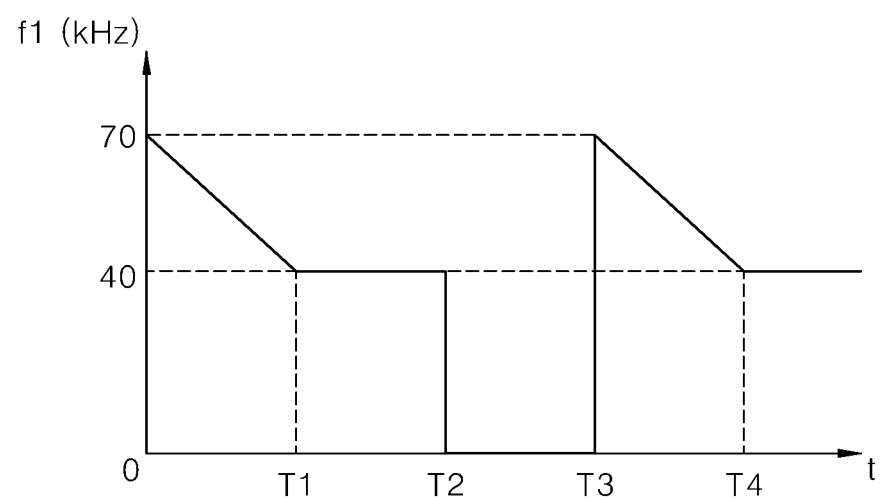
FIG. 6 is graph illustrating a process of controlling driving frequencies of a first working coil and a second working coil when an induction heating device according to an embodiment of the present disclosure is driven in a normal mode.
Figure 6:
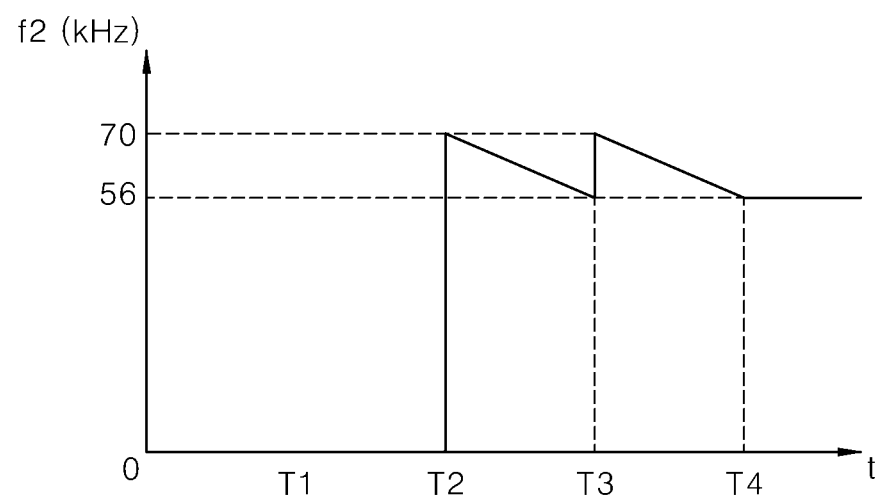

FIG. 4 is a graph illustrating a process of controlling driving frequencies of a first working coil and a second working coil when an induction heating device according to an embodiment of the present disclosure is driven in a coupling mode. FIG. 5 is a graph illustrating a process of controlling driving frequencies of a first working coil and a second working coil when an induction heating device according to an embodiment of the present disclosure is driven in a separation mode. FIG. 6 is graph illustrating a process of controlling driving frequencies of a first working coil and a second working coil when an induction heating device according to an embodiment of the present disclosure is driven in a normal mode.

Referring to FIG. 4, a user's driving command for the first working coil 103 may be input to the control unit 32 in a state where the second working coil 104 is not yet driven. The control unit 32 receiving the driving command for the first working coil 103 may drive the first working coil 103 at a preset first adjustment frequency (for example, 70 kHz). For reference, a magnitude of the first adjustment frequency may be set differently depending on the embodiment. Accordingly, at a time point 0, the first working coil 103 may start to be driven at 70 kHz, which is the first adjustment frequency.

The control unit 32 may search for a target frequency of the first working coil 103 (first target frequency) by adjusting the driving frequency of the first working coil 103 such that the first working coil 103 can supply an output corresponding to thermal power set by the user with respect to the first working coil 103.

For example, as in a time point 0 to a time point T1 of FIG. 4, the control unit 32 may calculate an amount of power supplied by the first working coil 103 while gradually reducing the driving frequency of the first working coil 103 from the first adjustment frequency (70 kHz). Here, the amount of power supplied by the first working coil 103 may be calculated based on an input voltage value transmitted from the voltage detection unit 212 and an input current value transmitted from the current detection unit 214.

The control unit 32 may determine a frequency value of the time point T1 (for example, 40 kHz) when the amount of power of the first working coil 103 measured while reducing the driving frequency corresponds to an output requested by the user via the driving command. Accordingly, the first working coil 103 may be driven at the first target frequency (40 kHz).

When the first working coil 103 is being driven at the first target frequency, the control unit 32 may receive a driving command for the second working coil 104. When the driving command for the second working coil 104 is received, the control unit 32 may stop driving of the first working coil 103 at a time point T2 so as to determine a target frequency of the second working coil 104 (second target frequency).

The control unit 32 may drive the second working coil 104 at the first adjustment frequency (70 kHz), simultaneously with stopping driving of the first working coil 103 at the time point T2. In some embodiments, the second working coil 104 may be driven at the first adjustment frequency after driving of the first working coil 103 is stopped and a preset time elapses.

The control unit 32 may calculate an amount of power supplied by the second working coil 104 while gradually reducing the driving frequency of the second working coil 103 in the same manner as the above-described process of searching for the target frequency of the first working coil 103. At a time point T3, when the amount of power supplied by the second working coil 104 corresponds to an output amount requested by the user, the control unit 32 may determine a frequency value of this time point T3 (43 kHz) as the second target frequency.

In some embodiments, the control unit 32 may determine a second target frequency corresponding to the driving command of the second working coil 104 with reference to a table in which a target frequency corresponding to an output requested by a user with respect to the second working coil 104 is recorded.

As described above, when driving of the second working coil 104 is requested while the first working coil 103 is being driven, driving of the first working coil 103 may be temporarily stopped to search for a target frequency of the second working coil 104. Accordingly, the driving frequency of the first working coil 103 may become 0 during a period (T2 to T3) for searching for the target frequency of the second working coil 104. By this control, interference noise between the first working coil 103 and the second working coil 103 may be prevented during the period (T2 to T3) of searching for the target frequency of the second working coil 104.

As described above, at a time point T3 when the second target frequency of the second working coil 104 is determined, the control unit 32 may compare the target frequencies of respective working coils with each other without immediately driving the first working coil 103 and the second working coil 103 at respective target frequencies. The control unit 32 may determine a driving mode of the induction heating device as one of modes for reducing interference noise (coupling mode and separation mode) and a normal mode according to a comparison result.

More specifically, the control unit 32 may calculate a difference value M between the first target frequency of the first working coil 103 and the second target frequency of the second working coil 104. The control unit 32 may determine a driving mode by comparing the calculated difference value M with two preset reference values, that is, a first reference value and a second reference value (here, the first reference value<the second reference value).

When the calculated difference value M is less than the first reference value, the control unit 32 may determine the driving mode of the induction heating device as the coupling mode. In the coupling mode, the control unit 32 may set the final driving frequency of the first working coil 103 and the final driving frequency of the second working coil 104 to be equal to each other.

For example, as in the embodiment of FIG. 4, when the first target frequency of the first working coil 103 is 40 kHz and the second target frequency of the second working coil 104 is determined to be 43 kHz at the time point T3, the control unit. 32 may calculate a difference value between the two target frequencies (43−40=3). The control unit 32 may compare 3, which is the calculated difference value, with 5, which is a preset first reference value. Since the difference value is less than the first reference value as a result of comparison, the control unit 32 may determine the driving mode of the induction heating device as the coupling mode, and may set a first final driving frequency of the first working coil 103 and a second final driving frequency of the second working coil 104 to 40 kHz, which is a value to be equal to each other.

As described above, in the present disclosure, when the difference value between the first target frequency of the first working coil 103 and the second target frequency of the second working coil 104 is less than the first reference value, the final driving frequencies of the two driving coils may be set to be equal to each other, thereby preventing interference noise caused by a difference between the driving frequencies of the two working coils.

As illustrated in FIG. 4, when the driving mode of the induction heating device is the coupling mode, the control unit 32 may set both the final driving frequencies of the first working coil 103 and the second working coil 104 to 40 kHz, which is the target frequency of the first working coil 103. However, in some embodiments, when the driving mode of the induction heating device is the coupling mode, the control unit 32 may set the final driving frequencies of the two working coils as 43 kHz, which is the target frequency of the second working coil 104, or may set the final driving frequencies of the two working coils to have a value different from a value of the target frequency of the second working coil 104 (for example, an average value of the target frequencies of the two working coils or an arbitrarily set value).

Meanwhile, when the difference value M between the first target frequency of the first working coil 103 and the second target frequency of the second working coil 104 is equal to or greater than the first reference value and less than the second reference value, the control unit 32 may determine the driving mode of the induction heating device as the separation mode. In the separation mode, the control unit 32 may set a difference between the final driving frequency of the first working coil 103 and the final driving frequency of the second working coil 104 to correspond to a preset noise avoidance setting value k.

For example, as in the embodiment of FIG. 5, when the first target frequency of the first working coil 103 is 40 kHz, and the second target frequency of the second working coil 104 is determined to be 50 kHz at the time point T3, the control unit 32 may calculate a difference value between the two target frequencies (50−40=10). The control unit 32 may compare 10, which is the calculated difference value, with 5, which is a preset first reference value, and 15, which is a preset second reference value. Since the difference value is equal to or greater than the first reference value and less than the second reference value as a result of comparison, the control unit 32 may determine the driving mode of the induction heating device as the separation mode.

Accordingly, the control unit 32 may set the first final driving frequency of the first working coil 103 to 40 kHz which is equal to the first target frequency. The control unit 32 may set the second final driving frequency of the second working coil 104 to 56 kHz which is a value greater by 16, which is the noise avoidance setting value k, than 40 kHz which is the first final driving frequency of the first working coil 103. Here, the noise avoidance setting value k may be set to another value (for example, 20) depending on the embodiment.

As described above, in the present disclosure, when a difference value between the first target frequency of the first working coil 103 and the second target frequency of the second working coil 104 is equal to or greater than the first reference value and less than the second reference value, the control unit 32 may set the final driving frequency of each working coil so that a difference between the final driving frequencies of the two working coils correspond to the preset noise avoidance setting value k. By this setting, the difference between the driving frequencies of the two working coils (16 kHz) may deviate from an audible frequency band (2 k to 15 kHz), and accordingly interference noise caused by driving of the working coils may be reduced.

In some embodiments, the control unit 32 may set the first final driving frequency of the first working coil 103 to have a value (for example, 36 kH) that is reduced from a value of the first target frequency (40 kHz) and set the second final driving frequency of the second working coil 104 to have a value (for example, 52 kHz) that is increased from a value of the second target frequency (50 kHz) such that a difference between the final driving frequency of the first working coil 103 and the final driving frequency of the second working coil 104 corresponds to 16, which is the preset noise avoidance setting value k.

In another embodiment, the control unit 32 may set the first final driving frequency of the first working coil 103 to have a value (for example, 34 kHz) that is reduced from a value of the first target frequency (40 kHz) and set the second final driving frequency of the second working coil 104 to have a value that is equal to a value of the second target frequency (50 kHz).

When determining a final driving frequency of a working coil, in a case in which the final driving frequency of the working coil is set to be lower than a target frequency of the working coil, thermal power which is higher than thermal power desired by the user, that is, thermal power provided by the target frequency, may be provided. Accordingly, it is preferable to set the final driving frequency of the working coil to be higher than the target frequency of the working coil in the separation mode.

Meanwhile, when the difference value M between the first target frequency of the first working coil 103 and the second target frequency of the second working coil 104 is equal to or greater than the second reference value, the control unit 32 may determine the driving mode of the induction heating device as the normal mode. The calculated difference value M that is greater than or equal to the second reference value means that a difference between the first target frequency of the first working coil 103 and the second target frequency of the second working coil 104 deviates from the audible frequency band (2 k to 15 kHz). Therefore, in this case, the control unit 32 may determine the first target frequency of the first working coil 103 as the first final driving frequency of the first working coil 103 and determine the second target frequency of the second working coil 104 as the second final driving frequency of the second working coil 104, without any change.

For example, as in the embodiment of FIG. 6, when the first target frequency of the first working coil 103 is 40 kHz, and the second target frequency of the second working coil 104 is determined to be 56 kHz at the time point T3, the control unit 32 may calculate a difference value between the two target frequencies (56−40=16). The control unit 32 may compare 16, which is the calculated difference value, with 15, the preset second reference value. Since the difference value is equal to or greater than the second reference value, the control unit 32 may determine the driving mode of the induction heating device as the normal mode.

Accordingly, the control unit 32 may set the first final driving frequency of the first working coil 103 to 40 kHz which is equal to the first target frequency. The control unit 32 may set the second final driving frequency of the second working coil 104 to 56 kHz which is equal to the second target frequency of the second working coil 104.

When the final driving frequencies of the first working coil 103 and the second working coil 104 are determined after the second target frequency of the second working coil 104 is determined at the time point T3 via the above-described process, the control unit 32 may drive the first working coil 103 at the first final driving frequency and drive the second working coil 104 at the second final driving frequency (refer to the time point T3 in FIGS. 4, 5, and 6). Accordingly, the first working coil 103 and the second working coil 104 perform a heating operation on a container without generating interference noise.

Figure 7:
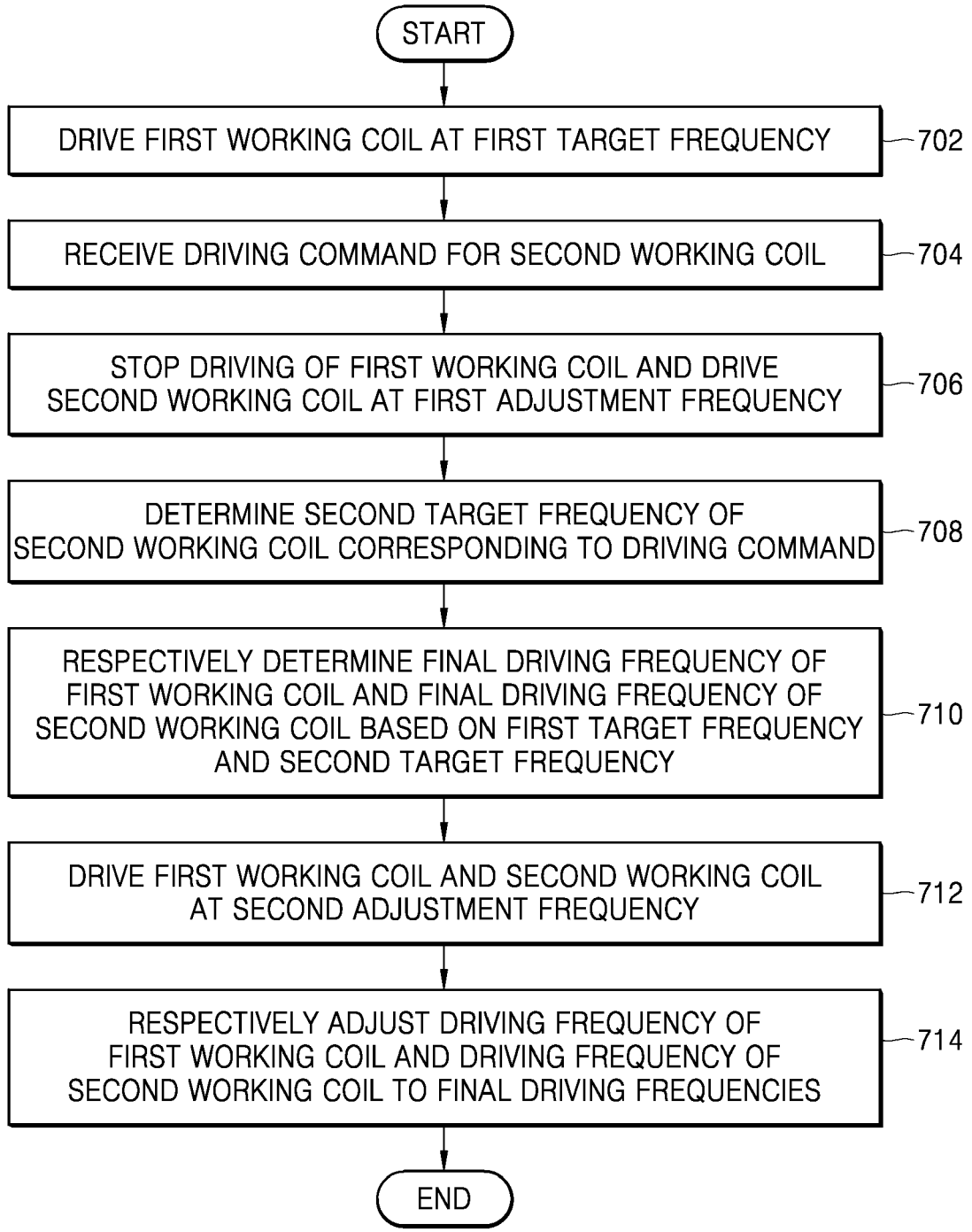
FIG. 7 is a flowchart illustrating a method for controlling an induction heating device according to an embodiment of the present disclosure.
Figure 8:
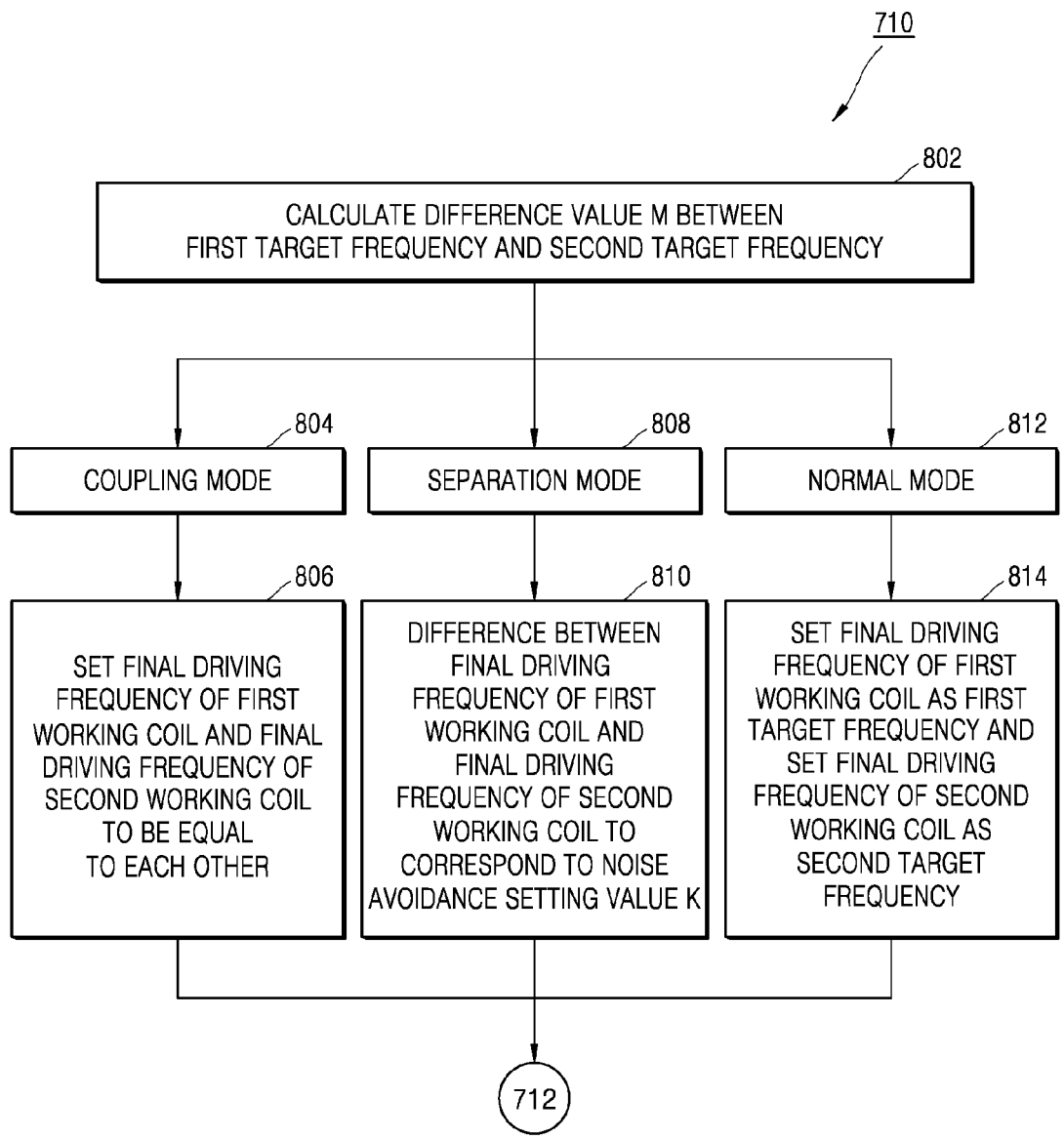
FIG. 8 is a flowchart illustrating a method for setting final driving frequencies of a first working coil and a second working coil according to an embodiment of the present disclosure.

FIG. 7 is a flowchart illustrating a method for controlling an induction heating device according to an embodiment of the present disclosure. FIG. 8 is a flowchart illustrating a method for obtaining final driving frequencies of a first working coil and a second working coil according to an embodiment of the present disclosure.

Referring to FIG. 7, the control unit 32 of the induction heating device according to an embodiment of the present disclosure may first drive a first working coil at a first target frequency (702). Although not illustrated in FIG. 7, the control unit 32 may, when a driving command for the first working coil is input, drive the first working coil at a first adjustment frequency (for example, 70 kHz) and then may, while reducing the driving frequency of the first working coil, check whether the first working coil provides an output corresponding to the driving command for the first working coil. The control unit 32 may set a driving frequency when an output of the first working coil corresponds to the output corresponding to the driving command for the first working coil as the first target frequency.

Next, the control unit 32 may receive a driving command for a second working coil while the first working coil is being driven at the first target frequency (704). The control unit 32 may stop driving of the first working coil and drive the second working coil at the preset first adjustment frequency (for example, 70 kHz) so as to determine a second target frequency of the second working coil (706).

The control unit 32 may determine the second target frequency of the second working coil corresponding to the driving command for the second working coil (708). The control unit 32 may, while reducing the driving frequency of the second working coil that is set to the first adjustment frequency, check whether the second working coil provides an output corresponding to the driving command for the second working coil. The control unit 32 may set a driving frequency when an output of the second working coil corresponds to the output corresponding to the driving command for the second working coil as the second target frequency.

Next, the control unit 32 may determine the first final driving frequency of the first working coil 103 and the second final driving frequency of the second working coil 104 based on the first target frequency and the second target frequency (710).

For example, as illustrated in FIG. 8, the control unit 32 may calculate a difference value M between the first target frequency and the second target frequency (802). The control unit 32 may compare the calculated difference value with the preset first reference value and the preset second reference value, and may determine the driving mode of the induction heating device according to a comparison result.

When the difference value M is less than the first reference value, the control unit 32 may determine the driving mode as the coupling mode (804), and may set the first final driving frequency of the first working coil 103 and the second final driving frequency of the second working coil 104 to be equal to each other (806).

When the difference value M is equal to or greater than the first reference value and less than the second reference value, the control unit 32 may determine the driving mode as a separation mode (808), and may set the final driving frequencies of respective working coils such that a difference between the first final driving frequency of the first working coil 103 and the second final driving frequency of the second working coil 104 corresponds to the preset noise avoidance setting value k (810).

When the difference value M is equal to or greater than the second reference value, the control unit 32 may determine the driving mode as the normal mode (812), and may set the first final driving frequency of the first working coil 103 and the second final driving frequency of the second working coil 104 as the first target frequency and second target frequency, respectively (814).

Referring back to FIG. 7, after the first final driving frequency of the first working coil and the second final driving frequency of the second working coil are determined, the control unit 32 may drive the first working coil 103 at the first final driving frequency and drive the second working coil 104 at the second final driving frequency (712). Accordingly, while being driven at the final driving frequencies, the first working coil 103 and the second working coil 104 perform a heating operation on a container without generating interference noise.

According to the present disclosure described so far, there is an advantage in that it is possible to reduce interference noise that may occur when two or more working coils provided in the induction heating device perform a heating operation. That is, it is possible to allow a difference value between the driving frequencies of the two working coils to deviate from the audible frequency band via a process of controlling the driving frequencies of respective working coils according to the above-described coupling mode or separation mode, thereby preventing interference noise.

The present disclosure has been described above with reference to the accompanying drawings, but the present disclosure is not limited by the embodiments and drawings disclosed herein, and it is apparent that various modifications may be made by those of ordinary skill in the art within the scope of the technical idea of the present disclosure. In addition, it should be understood that, even if advantageous effects according to the configurations of the present disclosure have not been explicitly described in the above description of the embodiments of the present disclosure, predictable advantageous effects of the corresponding configurations should also be recognized.

The invention claimed is:

1. A method for controlling an induction heating device, the method comprising:
    driving a first working coil at a first target frequency;
    receiving a driving command for a second working coil;
    stopping the driving of the first working coil and driving the second working coil at a preset first adjustment frequency; and
    determining a second target frequency of the second working coil corresponding to the driving command for the second working coil.

2. The method of claim 1, wherein the determining of the second target frequency of the second working coil includes:
    reducing a driving frequency of the second working coil; and
    determining a driving frequency when an output of the second working coil corresponds to a requested output corresponding to the driving command for the second working coil as the second target frequency.

3. The method of claim 1, further comprising:
    determining a first final driving frequency of the first working coil and a second final driving frequency of the second working coil based on the first target frequency and the second target frequency, respectively; and
    driving the first working coil at the first final driving frequency and driving the second working coil at the second final driving frequency.

4. The method of claim 3, wherein the determining of the first final driving frequency of the first working coil and the second final driving frequency of the second working coil includes:
- calculating a difference value between the first target frequency and the second target frequency; and
- determining the first final driving frequency and the second final driving frequency according to a comparison result between the difference value and a preset reference value.

5. The method of claim 4, wherein, when the difference value is less than a first reference value, the first final driving frequency and the second final driving frequency are set to be equal to each other.

6. The method of claim 4, wherein, when the difference value is less than the first reference value, the first final driving frequency and the second final driving frequency are set as any one among the first target frequency and the second target frequency.

7. The method of claim 4, wherein, when the difference value is equal to or greater than a first reference value and less than a second reference value, a difference between the first final driving frequency and the second final driving frequency is set to be equal to or greater than a preset noise avoidance setting value.

8. The method of claim 4, wherein, when the difference value is equal to or greater than a first reference value and less than a second reference value, a value obtained by increasing a larger value among the first target frequency and the second target frequency by the preset noise avoidance setting value or more and a smaller value among the first target frequency and the second target frequency are set as the first final driving frequency and the second final driving frequency, respectively.

9. The method of claim 4, wherein, when the difference value is equal to or greater than a second reference value, the first final driving frequency is set as the first target frequency, and the second final driving frequency is set as the second target frequency.

10. An induction heating device comprising:
- a first working coil disposed to correspond to a first heating area;
- a second working coil disposed to correspond to a second heating area; and
- a control unit configured to adjust driving frequencies of the first working coil and the second working coil according to a driving command input by a user,
- wherein the control unit drives the first working coil at a first target frequency, receives a driving command for the second working coil, stops driving of the first working coil and drives the second working coil at a preset first adjustment frequency, and determines a second target frequency of the second working coil corresponding to the driving command for the second working coil.

11. The induction heating device of claim 10, wherein the control unit reduces a driving frequency of the second working coil and determines a driving frequency when an output of the second working coil corresponds to a requested output corresponding to the driving command for the second working coil as the second target frequency.

12. The induction heating device of claim 10, wherein the control unit determines a first final driving frequency of the first working coil and a second final driving frequency of the second working coil based on the first target frequency and the second target frequency, respectively, and drives the first working coil at the first final driving frequency and drives the second working coil at the second final driving frequency.

13. The induction heating device of claim 12, wherein the control unit calculates a difference value between the first target frequency and the second target frequency and determines the first final driving frequency and the second final driving frequency according to a comparison result between the difference value and a preset reference value.

14. The induction heating device of claim 13, wherein, when the difference value is less than a first reference value, the first final driving frequency and the second final driving frequency are set to be equal to each other.

15. The induction heating device of claim 13, wherein, when the difference value is less than a first reference value, the first final driving frequency and the second final driving frequency are set as any one among the first target frequency and the second target frequency.

16. The induction heating device of claim 13, wherein, when the difference value is equal to or greater than a first reference value and less than a second reference value, a difference between the first final driving frequency and the second final driving frequency is set to be equal to or greater than a preset noise avoidance setting value.

17. The induction heating device of claim 13, wherein, when the difference value is equal to or greater than a first reference value and less than a second reference value, a value obtained by increasing a larger value among the first target frequency and the second target frequency by the preset noise avoidance setting value or more and a smaller value among the first target frequency and the second target frequency are set as the first final driving frequency and the second final driving frequency, respectively.

18. The induction heating device of claim 13, wherein, when the difference value is equal to or greater than a second reference value, the first final driving frequency is set as the first target frequency, and the second final driving frequency is set as the second target frequency.

* * * * *